May 3, 1960   G. A. LYON   2,935,359
WHEEL COVER
Filed Dec. 1, 1955
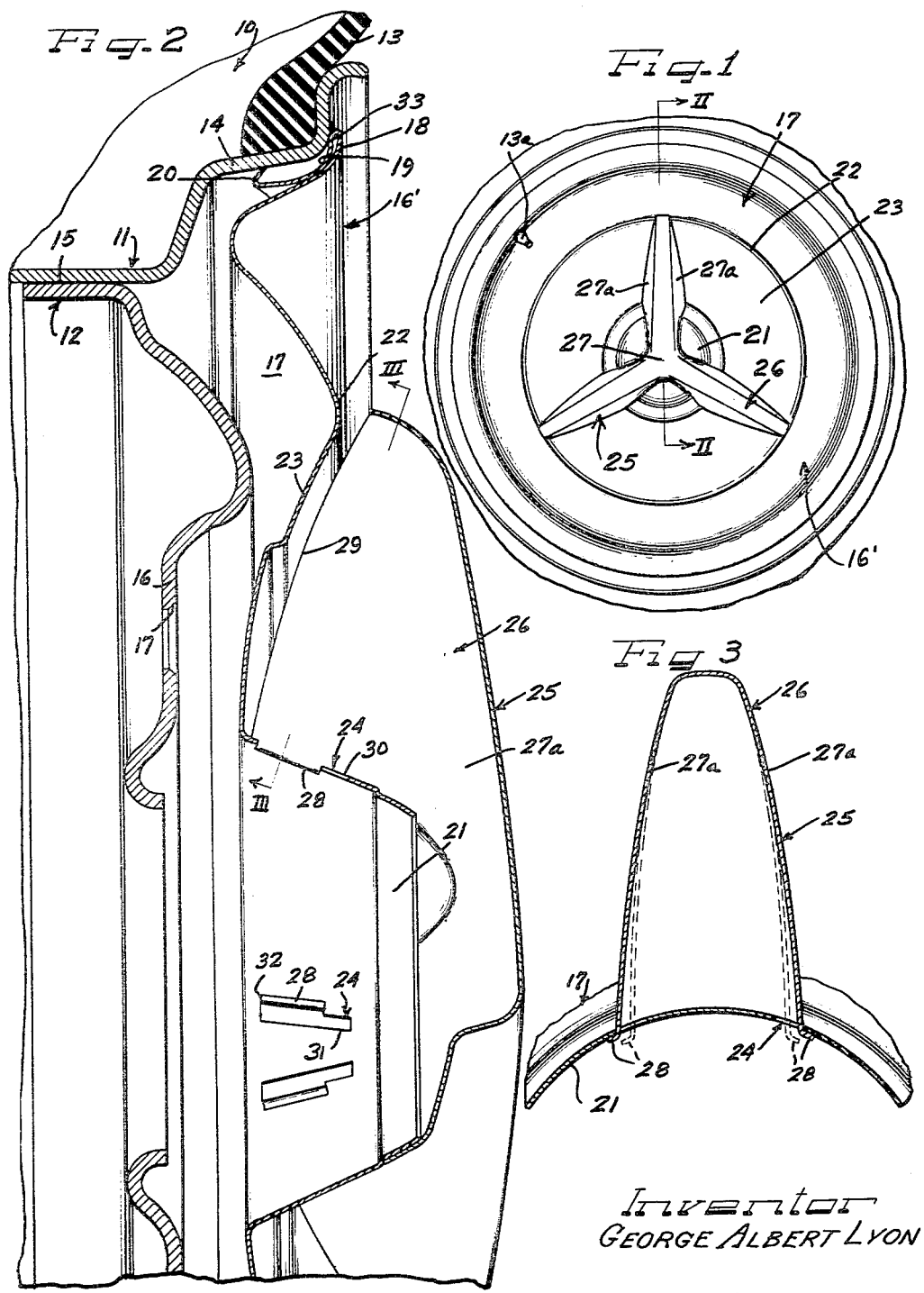
Inventor
GEORGE ALBERT LYON United States Patent Office 2,935,359
Patented May 3, 1960

2,935,359
WHEEL COVER
George Albert Lyon, Detroit, Mich.
Application December 1, 1955, Serial No. 550,422
15 Claims. (Cl. 301—37)

This invention relates generally to a wheel structure and more particularly to a multi-part cover construction including axially inner and outer cover members cooperable together in a highly new and improved manner and possessing outstanding ornamental qualities.

More specifically, this invention relates to a multipart cover construction including a central cover member for substantially overlying the rim and body parts of a vehicle wheel and having a propeller-like axially outer cover member having blade-like portions nestingly engaged and interlocked on the axially inner cover member in a new and improved manner.

An object of this invention is to provide a multipart cover construction in which each of the parts may comprise a one piece metal stamping.

Another object of this invention is to provide a multipart new and improved cover construction having improved means for retaining and interlocking the parts together.

Yet another object of this invention is to provide a new and improved multi-part cover construction which is relatively economical to manufacture on a large production basis, and lends itself to ready assembly.

According to the general features of this invention there is provided in a wheel structure including a wheel having rim and body parts, a cover for disposition on the outer side of the wheel including an axially inner circular cover member and an axially outer propeller-like cover member with the axially inner cover member substantially overlying the wheel and having cover retaining means for detachable engagement with one of the parts, the inner cover member having a centrally positioned generally axially outwardly extending portion and provided with circumferentially spaced sets of slots, and the outer cover member having several generally radially outwardly extending blade-like portions including edge portions nestingly engaged and bottomed on said centrally positioned portion and having resilient manually deflectable extensions retainingly engaged in one of the sets of slots.

Other objects and features of this invention will more fully become apparent from the following detailed description taken in connection with the accompanying drawing illustrating a single embodiment thereof and in which:

Figure 1 is a side elevation of my novel wheel structure embodying features of the present invention;

Figure 2 is an enlarged fragmentary cross sectional view taken substantially on the line II—II of Figure 1 looking in the direction indicated by the arrows; and Figure 3 is an enlarged fragmentary cross sectional view taken substantially on the line III—III of Figure 2 looking in the direction indicated by the arrows.

As shown on the drawing:

The reference numeral 10 indicates generally my novel wheel structure including a wheel having rim and body parts 11 and 12 respectively. It will be noted that the instant tire rim 11 is of the well known multi-flange drop center type and is adapted to carry thereon a tire assembly 13 which may be either of the tube or tubeless type as desired. In Figure 1, it will be noted that assembly 13 includes a valve stem 13a.

The rim 11 includes an axial flange 14 for purposes that will subsequently become more apparent. The body part 12 is more or less of a conventional construction and is joined at 15 to the tire rim 11. The body part 12 has an attachment flange 16 provided with an aperture 17 which is particularly designed to receive therethrough a threaded stud from a vehicle axle in order that a nut may be utilized to join the wheel structure 10 to the axle (not shown).

Carried upon the rim and body parts is my novel multi-part cover construction 16' which includes an axially inner cover member 17 which is adapted to substantially overlie the tire and rim parts. It will be noted that the cover member 17 is turned under at its outer margin 18 into a turned under portion 19 which has integral circumferentially spaced resilient cover retaining finger portions 20 capable of detachable snap-on, pry-off engagement with rim flange 14. Centrally pressed out of cover member 17 is a centrally positioned generally axially outwardly extending circular or tubular portion 21. Intermediate the outer margin 18 and the portion 21 is an annular rib 22 including a relatively flat annular surface 23 positioned radially inwardly of rib 22.

From the drawings and particularly Figure 2 it will be perceived that portion 21 is in reality a tube like portion open on the axially inner and outer ends thereof. Circumferentially spaced about the periphery of portion 21 are sets of slots 24.

Adapted to be centrally disposed and bottomed on axially inner cover member 17 is an axially outer propeller-like member 25. Both cover members 17 and 25 may be made out of spring steel or other suitable material and each of them may be stamped out from separate pieces of stock material.

Propeller-like member or plate 25 is preferably provided with a plurality of generally radially outwardly extending blade-like portions or arms 26. Each of the portions 26 is of generally U-shaped cross section (Figure 3) and extends from a central axis 27 in a radial direction and in each case has substantially the same radial dimension.

Each of the blade-like portions 26 includes a pair of generally axially inwardly extending resilient manually deflectable spaced legs 27a. Each of the legs 27a terminates in a resilient integral hooked extension 28 which is particularly adapted to be engaged in slots 24 in order that outer cover member 25 may be retained upon inner cover member 17 to comprise cover assembly 16'.

Each of the legs 27a includes a first radially extending edge portion 29 which when the cover members are assembled is adapted to be in spaced relation to surface 22 on cover member 17. The leg 27a has a second generally axially extending edge portion 30 which is so configurated as to be capable of snug nested engagement with pressed portion 21. From the foregoing it will be perceived that when the cover members are engaged together that they are in snug nested engagement relative to one another.

As is best seen in Figure 2 it will be noted that slot or edges 24 is generally an L-shaped configuration including a relatively elongated slot portion 31 and a second shortened slot portion 32 which has approximately the same axial dimension as the hooked extension 28. The slot 24 and the extension 28 comprise locking means for maintaining the cover members in assembly together. This construction is believed to be particularly advantageous since an initial loose engagement may be effected between the cover members when assembled before they are interlocked together in co-rotating assembly.

The cover members 17 and 25 may be assembled together by initially aligning central axis 27 of cover member 25 with the central axis of cover member 17. At this point one blade-like portion 26 may be manually gripped and upon the application of a slight inward pressure the legs 27a may be resiliently deflected towards one another with hook-like extensions 28 being aligned and then loosely engaged in slot portions 31 of slots 24. Thereafter, each of the other blade-like portions 26 are in a similar manner assembled upon pressed out portion 21. After each of the extensions 28 have been engaged in their corresponding slots 24, the propeller-like member 25 is urged upon the application of pressure toward the cover member 17 whereupon the extensions 28 snap into the smaller slot portion 32 in interlocked engagement therewith.

After the cover members 17 and 25 have been interlocked in assembly together to constitute a cover 16', the cover 16' is then ready to be assembled upon a vehicle wheel.

To this end, the central axis of the cover 16' is aligned with respect to the central axis of the wheel with the finger portions 20 loosely engaged upon shoulder 33. Upon the application of an axially inward force, the resilient finger portions 20 are flexed into gripping biting engagement with rim flange 14 to maintain the cover upon the wheel. In the illustrated embodiment it will be noted that outer cover margin 18 is bottomed on shoulder 33 to enhance the gripping engagement of finger portions 20 by providing a back-up.

Removal of the cover 16' from the wheel may be brought about by inserting a suitable pry-off tool underneath the margin 18. Upon the application of a twisting pry-off force, the cover 16' may be levered out of engagement with the rim flange 14.

Disassembly of the cover members 17 and 25 may be brought about by applying finger pressure on legs 27a—27a to disengage extensions 28 from slots 24.

It will be understood that modifications and variations may be effected without departing from the scope of the novel concepts of the present invention.

I claim as my invention:

1. In a wheel structure including a wheel having rim and body parts, a cover for disposition on the outer side of the wheel including an axially inner circular cover member and an axially outer propeller-like cover member with the axially inner cover member substantially overlying the wheel and having cover retaining means for detachable engagement with one of said parts, said inner cover member having a centrally positioned generally axially outwardly extending portion and provided with circumferentially spaced sets of slots, and said outer cover member having several generally radially outwardly extending blade-like portions including edge portions nestingly engaged and bottomed on said centrally positioned portion and having resilient manually deflectable extensions retainingly engaged in one of said sets of slots, the resilient manually deflectable extensions being bodily movable circumferentially of one another in the assembly of the extensions in the slots.

2. A cover for disposition on the outer side of a vehicle wheel including an axially inner cover member and an axially outer propeller-like member with the axially inner cover member substantially overlying the wheel and having cover retaining means for detachable engagement on the vehicle wheel, said inner cover member having a centrally positioned generally axially outwardly extending portion and provided with circumferentially spaced sets of slots, and said outer cover member having several generally radially outwardly extending blade like portions each of which is nestingly engaged over said centrally positioned portion and has resilient manually deflectable extensions retainingly engaged in one of said sets of slots, the resilient manually deflectable extensions being bodily movable circumferentially of one another in the assembly of the extensions in the slots.

3. In a wheel structure including a wheel having rim and body parts, a cover for disposition on the outer side of the wheel including an axially inner cover member and an axially outer cover member with the axially inner cover member substantially overlying the wheel and having a turned under outer margin equipped with circumferentially spaced resilient cover retaining finger portions for detachable engagement with said rim part, said inner cover member having a centrally positioned generally axially outwardly extending portion and provided with circumferentially spaced sets of slots, and said outer cover member having several generally radially outwardly extending blade-like portions each of which is nestingly engaged over said centrally positioned portion and having resilient manually deflectable extensions retainingly engaged in one of said sets of slots, the resilient manually deflectable extensions being bodily movable circumferentially of one another in the assembly of the extensions in the slots.

4. In a wheel structure including a wheel having rim and body parts, a cover for disposition on the outer side of the wheel including an axial inner circular cover member and an axially outer propeller-like cover member with the axially inner cover member substantially overlying the wheel and having cover retaining means for detachable engagement with one of said parts, said inner cover member having a centrally positioned generally axially outwardly extending portion and provided with circumferentially spaced sets of slots, and said outer cover member having several generally radially outwardly extending blade-like portions each of which is nestingly engaged over said centrally positioned portion and having resilient manually deflectable extensions retainingly engaged in one of said sets of slots, the resilient manually deflectable extensions on each of the blade-like portions diverging relative to one another in an axially inwardly extending direction and being bodily movable circumferentially of one another in the assembly of the extensions in the slots, each of said extensions being interlocked in one of said slots to insure co-rotation of the cover members.

5. A cover for disposition on the outer side of a vehicle wheel including an axially inner cover member and an axially outer propeller-like cover member with the axially inner cover member substantially overlying the wheel and having cover retaining means for detachable engagement on the vehicle wheel, said inner cover member having a centrally positioned generally axially outwardly extending portion and provided with circumferentially spaced sets of slots, and said outer cover member having several generally radially outwardly extending blade-like portions each of which is nestingly engaged over said centrally positioned portion and has resilient manually deflectable extensions retainingly engaged in one of said sets of slots, the resilient manually deflectable extensions on each of the blade-like portions diverging relative to one another in an axially inwardly extending direction and being bodily movable circumferentially of one another in the assembly of the extensions in the slots, each of said extensions being interlocked in one of said slots to insure co-rotation of the cover members.

6. In a wheel structure including a wheel having rim and body parts, a cover for disposition on the outer side of the wheel including an axially inner circular cover member and an axially outer propeller-like cover member with the axially inner cover member substantially overlying the wheel and having cover retaining means for detachable engagement with one of said parts, said inner cover member having a centrally positioned generally axially outwardly extending portion and provided with circumferentially spaced sets of slots, and said outer cover member having several generally radially outwardly extending blade-like portions each of which is nestingly engaged over said centrally positioned portion and having resilient manually deflectable extensions retainingly engaged in one of said sets of slots, the resilient manually deflectable extensions being arranged in pairs with the extensions in each pair being circumferentially spaced and bodily movable relative to one another in the assembly of the inner and outer cover members together, said outer cover member comprising a one piece metal stamping.

7. In a wheel structure including a wheel having rim and body parts, a cover for disposition on the outer side of the wheel including an axially inner circular cover member and an axially outer propeller-like cover member with the axially inner cover member substantially overlying the wheel and having cover retaining means for detachable engagement with one of said parts, said inner cover member having a centrally positioned generally axially outwardly extending portion and provided with circumferentially spaced sets of slots, and said outer cover member having several generally radially outwardly extending blade-like portions each of which is nestingly engaged over said centrally positioned portion and having resilient manually deflectable extensions retainingly engaged in one of said sets of slots, the resilient manually deflectable extensions being arranged in pairs with the extensions in each pair being circumferentially spaced and bodily movable relative to one another in the assembly of the inner and outer cover members together.

8. In a wheel structure including a wheel having rim and body parts, a cover for disposition on the outer side of the wheel including an axially inner circular cover member and an axially outer propeller-like cover member with the axially inner cover member substantially overlying the wheel and having cover retaining means for detachable engagement with one of said parts, said inner cover member having a centrally positioned generally axially outwardly extending portion and provided with circumferentially spaced sets of slots, and said outer cover member having several generally radially outwardly extending blade-like portions each of which has circumferentially spaced resilient manually deflectable axially inwardly extending legs including radially inwardly extending extensions retainingly engaged in one of said sets of slots with the outer cover member snugly bottomed and retained upon the inner cover member in assembly.

9. In a wheel structure including rim and body parts, a circular cover member for disposition upon the outer side of the wheel having a central portion provided with circumferentially spaced sets of slots, and an outer cover member having a central axis from which a plurality of circumferentially spaced radially outwardly extending arms radiate, each of said arms including resilient manually flexible legs each having extensions engageable in one of said slots to retain the cover members in assembly.

10. In a wheel structure including rim and body parts, a circular cover member for disposition upon the outer side of the wheel having a central portion provided with circumferentially spaced sets of slots, an outer cover member having a central axis from which a plurality of circumferentially spaced radially outwardly extending arms radiate, each of said arms including axially inwardly diverging resilient manually flexible legs each having extensions engageable in one of said slots to retain the cover members in assembly, and locking means interposed between said members to interlock same in assembly.

11. A cover member for disposition upon the outer side of a vehicle wheel having a central portion provided with circumferentially spaced sets of slots, and an outer cover member having a central axis from which a plurality of radially outwardly extending arms radiate, each of said arms including resilient manually flexible legs each having extensions engageable in one of said slots to retain the cover members in assembly, the manually flexible legs being bodily movable toward and away from one another in the assembly of the cover members.

12. A cover member for disposition upon the outer side of a vehicle wheel having a central portion provided with circumferentially spaced sets of slots, and an outer cover member having a central axis from which a plurality of radially outwardly extending arms radiate, each of said arms including circumferentially spaced resilient manually flexible legs each having extensions engageable in one of said slots to retain the cover members in assembly, each of said slots including an elongated and a shortened portion whereby when said extension is inserted into said elongated portion an initial engagement is obtained and upon an application of pressure on said outer cover member, said extension snaps into detachable interlocked retained engagement in said shortened slot portion.

13. A cover member for disposition upon the outer side of a vehicle wheel having a central portion provided with circumferentially spaced sets of slots, and an outer cover member having a central axis from which a plurality of radially outwardly extending arms radiate, each of said arms including circumferentially spaced resilient manually flexible legs each having extensions engageable in one of said slots to retain the cover members in assembly, each of said slots including an elongated and a shortened portion whereby when said extension is inserted into said elongated portion an initial engagement is obtained and upon an application of pressure on said outer cover member, said extension snaps into detachable interlocked retained engagement in said shortened slot portion, said slots being in divergent relation to one another to accommodate divergent retaining extensions.

14. In a cover for disposition over the outer side of a vehicle wheel, a circular cover member having a generally axially extending and radially facing portion provided with a plurality of circumferentially spaced openings therethrough, and means providing a plurality of generally radially extending hollow members disposed to open toward said cover member and having side walls that are resiliently flexibly movable toward and away from one another relative to a normal spaced relation thereof, said side walls having turned interlock extensions thereon respectively engageable in and removable from said openings by resilient flexing of said side walls from said normal spaced relation and within said openings coacting with said cover portion for retaining the respective hollow members in place relative to the cover member.

15. A cover for disposition on the outer side of a vehicle wheel including an axially inner cover member and an axially outer propeller-like member with the axially inner cover member being adapted to overlie a wheel for assembly on a vehicle wheel, said axially outer cover member haivng circumferentially spaced arms each having a pair of circumferentially spaced generally radially outwardly extending resilient manually deflectable blade-like portions disposed over the axially inner cover member, said axially inner cover and each of said blade-like portions having means for fastening each of said blade-like portions to said axially inner cover member, said means including circularly arranged edges and extensions on said cover members, each of said arms being assembled with the axially inner cover member independently of the other arms by manually flexing the circumferentially spaced radially outwardly extending resilient manually deflectable blade-like portions on one of said arms circumferentially towards one another to engage said edges and said extensions together thereby assembling said arm with the axially inner cover member.

References Cited in the file of this patent

UNITED STATES PATENTS

| | | |
|---|---|---|
| 1,282,546 | Denison | Oct. 22, 1918 |
| 2,226,098 | Hedstrom | Dec. 24, 1940 |
| 2,276,405 | Lyon | Mar. 17, 1942 |